United States Patent [19]

O'Brien et al.

[11] Patent Number: 5,390,322
[45] Date of Patent: Feb. 14, 1995

[54] APPARATUS AND METHOD FOR RETAINING CYCLE MEMORY IN ELECTRONIC STERILIZER CONTROLS

[76] Inventors: Michael J. O'Brien, 5956 Chili Riga Ctr. Rd., Churchville, N.Y. 14428; Charles E. Ellis, 1287 Maryland Rd., Phelps, N.Y. 14532; Kenneth A. Johnson, 3472 Ontario Ctr. Rd., Walworth, N.Y. 14568

[21] Appl. No.: 648,912

[22] Filed: Feb. 1, 1991

[51] Int. Cl.$^6$ .................... G06F 11/34; G06F 11/00
[52] U.S. Cl. .................... 395/575; 371/66; 365/229
[58] Field of Search .......... 371/66; 395/575; 365/226, 228, 229; 364/184, 187, 143, 273.4

[56] References Cited

U.S. PATENT DOCUMENTS

| | | | |
|---|---|---|---|
| 4,042,805 | 8/1977 | Kopacz | 219/492 |
| 4,580,248 | 4/1986 | Imaizumi | 365/229 |
| 4,636,949 | 1/1987 | Longabaugh | 364/400 |
| 4,750,040 | 6/1988 | Hakamada | 358/188 |
| 4,763,333 | 9/1990 | Byrd | 371/66 |
| 4,965,828 | 10/1990 | Ergott et al. | 371/14 |
| 5,018,148 | 5/1991 | Patel et al. | 371/66 |

Primary Examiner—Robert W. Beausoliel, Jr.
Assistant Examiner—Trinh L. Tu
Attorney, Agent, or Firm—Trask, Britt & Rossa

[57] ABSTRACT

Apparatus and methods for providing memory backup of sterilizer cycle progress in a sterilizer control apparatus are disclosed. The control apparatus includes a microprocessor operable to detect a drop or failure in power from the external source, a RAM for temporary storage of data from the microprocessor, and a clock chip. The clock chip and the RAM receive their power from a backup voltage source which is normally charged by the external power source. The clock chip includes a bit which can be set by receipt of an input signal.

A comparator circuit is connected to compare the backup voltage VBAK to the minimum power required for accurately retaining memory in the RAM. When VBAK falls below the minimum required power, the comparator sends a signal to the clock chip to set the bit. After power is restored, the microprocessor checks the bit in the clock, and, if the bit is not set, continues operating the sterilizing cycle from the point at which it was interrupted by the power failure. If the bit is set, the cycle is restarted from the beginning.

14 Claims, 1 Drawing Sheet

APPARATUS AND METHOD FOR RETAINING CYCLE MEMORY IN ELECTRONIC STERILIZER CONTROLS

BACKGROUND OF THE INVENTION

1. Field

The invention relates to electronic controllers for sterilizers, and more particularly to memory backup in the event of power failures in such controllers.

2. State of the Art

Many electronic control devices depend on a random access memory (RAM) to provide information as to the progress through a control cycle. If the voltage to the RAM drops too low, as for example when a power failure occurs, the information accumulated in the RAM is lost. Then, when power is restarted, the unit must reset and begin its cycle over again. In a sterilizer device, such resetting means that the portion of the cycle already completed at the time of the power failure is wasted. It is therefore desirable that such controllers be able to retain data reflecting the progress through the immediate ongoing cycle in the RAM, so that the cycle may be continued from the point of interruption. On the other hand, if the power outage lasts too long there may be significant deviations from the temperature, pressure or other parameters prescribed for the portion of the cycle in which the outage occurs. In the latter case, to assure achieving sterility of the load it is better to restart the cycle than to continue from the interrupt point.

One approach to this problem is to have an alternate power source such as a battery available. However, batteries must be recharged or replaced at intervals. Record keeping is burdensome and employee time spent in such record keeping is expensive. Also, a low battery can result in failure to maintain the memory during an outage. By itself, a battery does not provide any means for determining whether the cycle data have been accurately retained.

A less expensive alternative is to include a capacitor circuit for temporary storage of charge from the main power source, as is described for an automatic cooking apparatus in U.S. Pat. No. 4,636,949 to Longabaugh. However, a capacitor will discharge fairly rapidly, and thus the voltage supplied therefrom may still drop below that required to assure retention of the cycle memory. Thus, it is still necessary to provide some means for determining whether the RAM data have been accurately retained. U.S. Pat. No. 4,750,040 to Hakamada discloses circuitry and programming for this purpose. However, a system such as that of Hakamada is too expensive and complicated to be suitable for a sterilizer system.

Accordingly, a need remains for means to retain cycle memory in sterilizers which is simple, inexpensive, and has the capacity to determine whether the cycle progress data have been accurately retained. A need moreover remains for such means which can discriminate between outages brief enough that the cycle can be continued from the point of interruption, and those in which restarting of the cycle from its beginning is needed to assure sterilization of the load.

SUMMARY OF THE INVENTION

Apparatus and methods for providing memory backup in a control apparatus of the kind operable to control a sterilizer to execute a sterilization cycles are disclosed. A control system connected to an external source of electrical power includes a microprocessor operable to detect a drop or failure in power from the external source. A time memory element is connected to the microprocessor for providing time information during execution of a sterilization cycle. The time memory element requires a minimum power for functioning and includes a bit normally in a first and settable to a second state by receipt of an input signal. A cycle progress memory element is connected to the microprocessor to receive and temporarily store cycle data. The cycle memory element requires a minimum power for maintaining said memory.

Backup power means are provided and connected for temporarily supplying backup power referred to in this disclosure as "VBAK" to the time memory element and the cycle memory element. The backup power means is connected to be charged by the external power source. A comparator circuit is included in the memory backup means for comparing VBAK to the minimum power required for accurately retaining memory in the cycle memory element and the time memory element. The comparator is connected to the time memory element, and functions to set the bit to its second state when VBAK falls below the minimum required power.

The control system is operable to determine that a power failure has occurred and in response to send cycle progress data from the microprocessor to be stored in the cycle memory element. The control system is further provided with means to determine that a power failure has occurred and to send a signal to the microprocessor reflective of the power failure. In response to the power failure signal, the microprocessor stores data in the cycle memory element.

After power is restored, the microprocessor is further operable to check the bit in the time memory element, and, if the bit is not set, to continue operating the sterilizing cycle from the point at which it was interrupted by the power failure, or, if the bit is set, to restart the cycle from the beginning.

BRIEF DESCRIPTION OF THE DRAWINGS

The drawing is a diagram of a practical circuit which functions as described in the application.

DETAILED DESCRIPTION OF THE ILLUSTRATED EMBODIMENT

Figure 1:
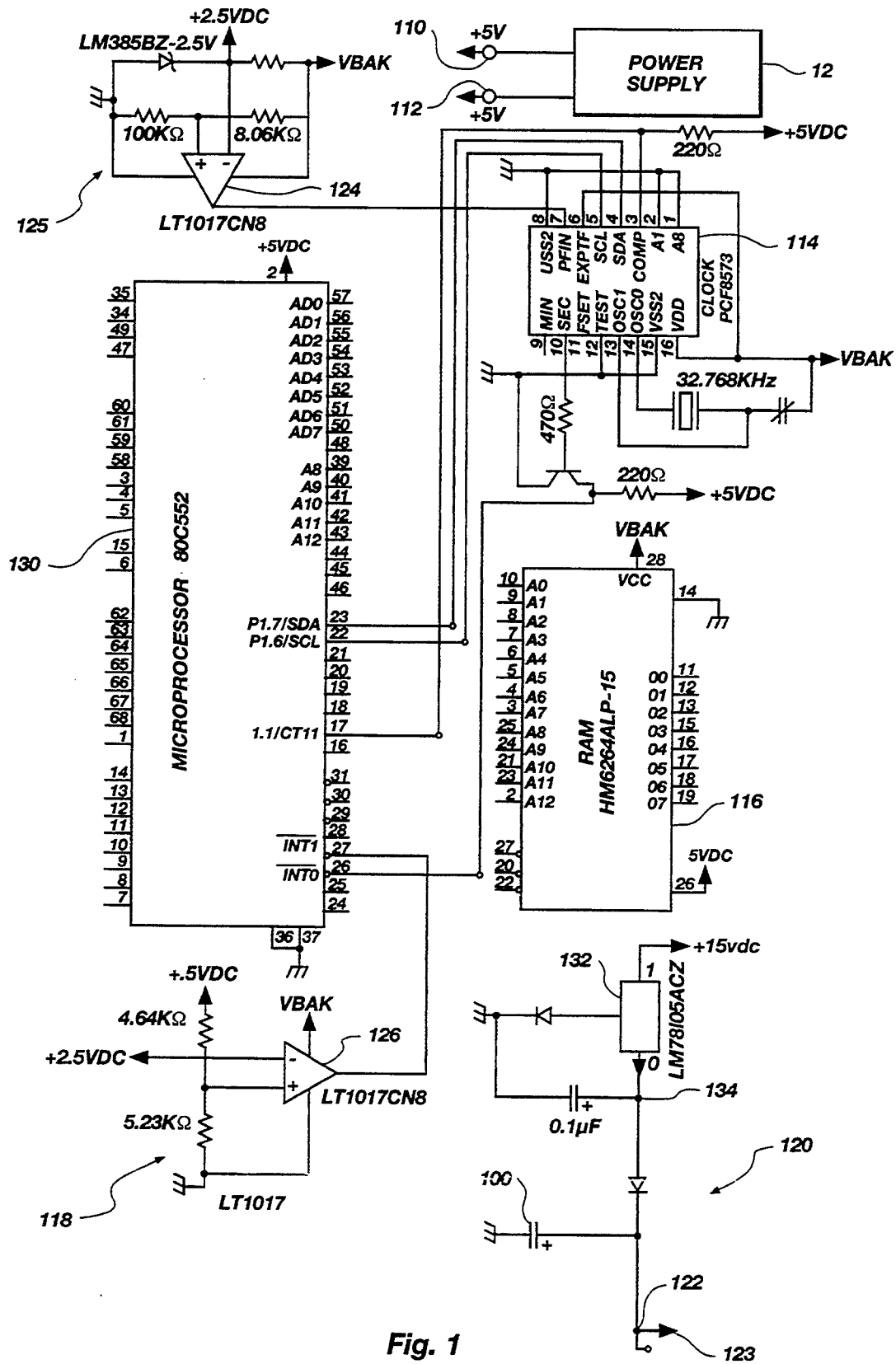

The drawing illustrates elements of a microprocessor-based sterilizer control apparatus operable to save cycle memory in the event of a power failure. The illustrated elements of the control apparatus include a microprocessor 130, RAM 116, realtime clock 114, circuit means for detecting a power failure indicated generally at 118, and means for providing backup power indicated generally at 120. The sterilizer control apparatus is connected to an external power source 12.

The control apparatus in which the illustrated elements are incorporated is otherwise representative of control apparatuses widely used to control sterilizers. Sterilizers systems typically include a sterilizer chamber, and means to provide steam or a chemical vapor at elevated temperatures and/or pressures for sterilizing a load in the chamber. The typical control apparatus is operable to receive pressure and/or temperature data from appropriate sensors, and to control the provision of vapors and the heating and pressurization the chamber during sterilizing cycles. To perform these functions, the control apparatus includes other circuits and circuit chips not shown in the drawing.

With respect to microprocessor 130 and RAM 116, only the pin connections required to implement the memory retaining apparatus of this application are shown. Pins designated A8 through A12 on RAM 116 are connected to similarly-designated pins on microprocessor 130. Pins designated 00 through 07 on RAM 116 are connected to pins AD0 through AD7 on microprocessor 130. Pins A0 through A7 of RAM 116 are connected to a latch circuit chip and in turn to pins AD0 through AD7 of microprocessor 130. For clarity, these connections are not shown in FIG. 1. The unmarked pins are connected as conventionally known for performing other control functions. Microprocessor 130 is shown as being a Signetics 80C552, but any other microprocessor which can function similarly is also suitable.

In the practical embodiment illustrated, power source 12 provides power at +5 volts and +15 volts DC via outputs 110 and 112, respectively. The RAM 116, clock 114 and microprocessor 130 are preferably operated at +5 volts DC, and arrows designated to +5 volts indicate that power is received from power source 12 via output 110. Arrows designated to VBAK indicate an effective connection to the backup power means 120 at junction 122.

Means for detecting a power failure 118 is shown as a comparator circuit including comparator 126. The output of comparator 126 is connected to microprocessor 130 to provide a signal indicating that power failure has occurred. When microprocessor 130 receives this signal, it sends data from the microprocessor registers to RAM 116 to be stored.

Realtime clock 114 is connected to microprocessor 130 to provide elapsed time information. Clock 114 is connected to receive VBAK which, when the power is on, is 5V.

Clock 114 includes a bit which can be set by an input. The term "bit" designates a binary information element which can be set to either of two states (referred to as 0 or 1) and which is widely used in logic circuits. The default bit state is 0, but when the bit input is activated, the bit state is changed to 1. Microprocessor 130 is connected to clock 114 to read the output of the bit. Any clock chip having a free settable bit may be used as clock 114. In the practical embodiment illustrated, clock chip 114 is a Signetics PCF8573. Other suitable clock chips include the Hitachi HD146818 and the Motorola MC68HC68TI.

RAM 116 is a random access memory device as known for providing temporary or volatile memory in computing devices. RAM 116 is connected to receive and store data from microprocessor 130, and to load stored data back into microprocessor 130. RAM 116 is connected to output 123 of power backup means 120 to receive VBAK. In the practical illustration, RAM 116 is an 8K×8 static RAM, Hitachi HM6264ALP-15. However, other RAM devices may be substituted providing only that they be operable to perform similar functions.

Backup power means 120 includes a capacitor 100 connected to be charged by 5 volts received from power source 12, as long as power source 12 is operative. Junction 122 and output 123 are effectively held at the backup voltage from the capacitor 100. In the practical circuit illustrated, voltage regulator 132 receives +15 volts from power source 12 and provides 5.7 volts at junction 134. An 0.7 volt power drop across diode 136 results in a 5V charge to capacitor 100. Capacitor 100 is a one farad capacitor charged to provide about five volts DC at junction 120. Any capacitor between about 1000 μF and about 1F may be used. Those smaller than 1 farad will provide power for a shorter period.

A comparator circuit 125 is further included in the memory backup system. Comparator circuit 125 includes low power voltage comparator 124 and is connected to read the backup voltage from output 123 of power backup means 120. Comparator circuit 125 is operable to compare the backup voltage to a selected minimum level, and to provide an output signal when the backup voltage falls below the selected minimum. Clock 114 is connected to receive the output signal at the bit input; receipt of the output signal sets the bit. The minimum level at which comparator 124 sends the output signal is chosen to correspond to the minimum voltage required to accurately maintain memory in RAM 116 and clock 114. In the embodiment illustrated, comparator 124 may be an LT1017.

Capacitor 100 is kept normally charged via the input power source 12. In the event of a power failure, capacitor 100 discharges and thereby supplies current to RAM 116 and realtime clock 114. If comparator 124 detects that VBAK has dropped below the minimum value which assures accurate retention of memory in the RAM, the comparator output sends a signal to the bit input on clock 114 to set the bit.

When normal power is restored, microprocessor 130 recognizes that a power failure has occurred and checks clock 114 to see if the bit is set. If the bit is not set, microprocessor 130 loads the data from RAM 116 and clock 114 back into the microprocessor and continues the cycle from the point of interruption. If the bit is set, microprocessor 130 does not load the RAM data and performs a complete reset. Thus, in the latter case the cycle is restarted from the beginning.

The time in which the backup voltage drops to a level insufficient to maintain memory depends on the properties and charging level of capacitor 100, and on the minimum voltage required to maintain memories in the RAM 116 and clock chip 114. The minimum voltage for memory retention of the particular components shown is about 2.5 volts DC. Therefore, comparators 124 and 126 are referenced to 2.5 volts.

Capacitor 100 will inevitably discharge to below the minimum required voltage, typically in about an hour. Thus, power drops lasting more than an hour will cause the bit in clock 114 to be set, which in turn results in the sterilizing cycle being restarted from the beginning.

The illustrated embodiment was constructed for use with an electrically heated, unplumbed sterilizer. However, the apparatus and method could be used with any other type of sterilizer, including plumbed steam-injected sterilizers, chemical vapor sterilizers, and gas sterilizers, in which chamber conditions are critical variables controlled by a microprocessor.

Power outages longer than about an hour allow chamber conditions to change sufficiently that, to ensure sterility of the load, it is best to restart the entire cycle. Nevertheless, since an individual cycle may be five to six hours in length, if the outage is less than an hour it is highly desirable to finish the cycle from the point of interruption. A memory retaining system as described in this application distinguishes between and responds appropriately to each of these two types of power outages.

If desired, the disclosed circuits could be adapted to a "critical" outage time other than five minutes, by appropriate selection of capacitor and charging level.

The disclosed means for retaining cycle memory thus ensures that if a brief power drop or interruption occurs, the sterilizing cycle can be continued from the point of interruption. If the drop or interruption is long enough to disrupt the chamber conditions and jeopardize sterilization of the load, the cycle is restarted from the beginning. The apparatus is simple and inexpensive to implement, requiring neither complex software nor a battery.

Reference herein to certain details of the illustrated embodiments is not intended to limit the scope of the appended claims which themselves recite those features regarded as important to the invention.

What is claimed is:

1. A control apparatus comprising:
   a CPU connected in circuit with an external source of electrical power and operably constructed and connectable to control a sterilizing apparatus to execute a sterilization cycle and to accumulate cycle data during said sterilization cycle;
   power failure detection means connected in circuit with said external power source and said CPU for detecting power insufficiency and in response providing a signal reflective of said power insufficiency to said CPU;
   time memory means connected in circuit with said CPU for providing time data during execution of said sterilization cycle, said time memory means including a bit normally in a first state and settable to a second state;
   cycle memory means connected in circuit with said CPU to receive and store said cycle data, said cycle memory means requiring a minimum voltage for maintaining said data in storage;
   a chargeable backup power source connected in circuit with said CPU for supplying backup power during a power insufficiency event to said time memory means and said cycle memory means, and connected in circuit with said external power source whereby to be charged by said electrical power source;
   comparator means connected in circuit with said backup power source for comparing the voltage of said backup power source to said minimum voltage, and operable to provide an output to said time memory means to set said bit to said second state when said backup power falls below said minimum voltage; and
   wherein said CPU is operably constructed to respond to said power insufficiency signal by storing said cycle data in said cycle memory means, and when power is restored from said external source, said CPU is further operably constructed to check said bit in said time memory means,
      continue to operate a sterilizing apparatus from the point at which said power failure interrupted said sterilization cycle if said bit is in said first state, and
      restart operation of said sterilizing apparatus from the start of said sterilization cycle if said bit is in said second state.

2. The control apparatus of claim 1, wherein said backup power source includes a capacitor connected in circuit to supply said backup voltage to said time memory means and cycle memory means and to be normally charged by said external power source;

3. The control apparatus of claim 1, wherein said backup power source is operable to supply backup voltage equal to or exceeding said minimum voltage for a selected time interval during said power insufficiency.

4. In an electronic controller for a sterilizer, the controller having a real time clock and a RAM for monitoring progress through a sterilizing cycle and being connected to receive power from an external power source, a method of determining whether to continue a sterilizing cycle which has been interrupted by a power failure from the point of cycle interruption, comprising:
   providing a source of backup power to be normally charged by the external power source;
   connecting the real time clock and the RAM to receive power from the backup power source and to thereby cause said backup power source to discharge;
   comparing the level of backup power provided by the backup power source to a minimum required level during the power failure;
   providing an indicator element connected to be read by the electronic controller, the indicator element having a default state and being settable to an "on" state;
   setting the indicator element to the on state when the backup voltage drops below the minimum required level;
   checking the indicator element after power is restored to determine whether the indicator element is set to the on state, and if not, resuming the sterilizing cycle at the point of cycle interruption, or, if the indicator element is set to the on state, restarting the sterilizing cycle at the beginning.

5. The method of claim 4 wherein said steps of comparing the backup power and setting the indicator element are accomplished by providing a low voltage comparator disposed to detect the power received by the real time clock from the backup power source and operable to compare the received power with the minimum required level, and to provide a signal to the clock to set the indicator element when the received power drops below the minimum power, and wherein the minimum required level is the minimum power required to assure maintenance of memory in the RAM.

6. A sterilization apparatus comprising:
   a sterilization unit including
      a sterilization chamber, and
      sterilization means operably associated with said sterilization chamber for producing sterilizing conditions therein;
   a CPU communicatively connected to control said sterilization means, and operably constructed to supervise said sterilization means in performance of a sterilization cycle;
   an external power source connected to provide electrical power to said sterilization means and said CPU;
   power failure detection means connected in circuit with said CPU and said external power source for detecting power insufficiency, and operable to provide a signal informative of said power insufficiency to said CPU;
   a timer connected in circuit with said CPU for providing time data during execution of a sterilization cycle, and including a bit operable between a default state and an active state;

cycle memory means connected in circuit with said CPU for storing cycle data of an ongoing cycle interrupted by said power insufficiency;

a backup power source in circuit with said timer and said cycle memory means for temporarily supplying backup voltage thereto;

comparator means connected in circuit with said backup power source for comparing said backup voltage to a minimum voltage, and operably connected to said timer to set said bit to said active state when the voltage of said backup power source falls below said minimum voltage;

wherein said CPU is operable to respond to said power insufficiency signal by storing said cycle data in said cycle memory means, to check said bit in said timer when power is restored from said external source, to continue supervision of said sterilization cycle from the point at which said power insufficiency interrupted said sterilization cycle if said bit is in said default state, and to restart said sterilization cycle at its beginning if said bit is in said active state.

7. The sterilization apparatus of claim 6, wherein said backup power source is configured to supply said backup voltage at a level greater than or equal to said minimum voltage only for a selected maximum time.

8. The sterilization apparatus of claim 7, wherein said backup power source comprises a capacitor connected to be charged by said external power source and to be discharged by supplying said backup power to said timer and said cycle memory means during said power insufficiency.

9. The sterilization apparatus of claim 8 wherein said selected maximum time is about an hour.

10. In a control apparatus constructed and connected to control a sterilizing system to execute a sterilization cycle, and including a CPU connected in circuit with an external source of electrical power, a timer operably associated with the CPU for providing elapsed time data during said sterilization cycle, a power failure detector connected in circuit with the CPU and the external power source and constructed to sense a power insufficiency and in response to send a power failure signal to the CPU, and a cycle memory element connected to receive and temporarily store cycle data received from the CPU during the power insufficiency, the improvement comprising:

a backup power source connected to be charged by the external power source and in circuit with the timer and the cycle memory element for supplying a backup voltage thereto, said backup power source being discharged thereby;

comparator means electrically connected for comparing said backup voltage to a minimum voltage, and operable to provide an output signal when said backup voltage falls below said minimum voltage, and an indicator element normally in a first state and settable to a second state, said element connected to said comparator means to be set to said second state upon receipt of said output signal;

wherein the CPU is constructed to check said indicator element when power is restored, and if said indicator element is in said first state, to continue to operate the sterilization cycle from the point at which the power failure interrupted the cycle, and if said indicator element is in said second state, to restart the sterilization cycle at its beginning.

11. The improvement of claim 10, wherein said indicator element is a settable bit operably disposed in the timer.

12. The improvement of claim 11, wherein said backup power source is constructed to provide a minimum voltage required by the cycle memory element and the timer for a selected maximum interval.

13. The improvement of claim 12, wherein said backup power source comprises a capacitor connected to be charged by the external power source and to be discharged by supplying said backup power to the timer and the cycle memory element during the power insufficiency.

14. The improvement of claim 13, wherein said maximum interval is about an hour.

* * * * *